United States Patent
Bartholomä et al.

(10) Patent No.: US 6,406,068 B1
(45) Date of Patent: Jun. 18, 2002

(54) CONNECTION FITTING FOR FASTENING LONG BODIES

(75) Inventors: Mario Bartholomä, Winden; Fritz Zügel, Waldkirch; Volker Götz, Kenzingen; Philipp Gerber, Waldkirch, all of (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 09/603,694

(22) Filed: Jun. 26, 2000

(30) Foreign Application Priority Data

Jun. 30, 1999 (DE) ...................................... 299 11 362 U

(51) Int. Cl.⁷ ................................................ F16L 41/00
(52) U.S. Cl. ...................................... 285/210; 285/208
(58) Field of Search .................................. 285/210, 208, 285/194, 322, 323, 126.1, 179.1

(56) References Cited

U.S. PATENT DOCUMENTS

| | | | | |
|---|---|---|---|---|
| 522,005 A | * | 6/1894 | Burke | 285/210 |
| 531,425 A | * | 12/1894 | Porteous | 285/210 |
| 2,967,722 A | * | 1/1961 | Lifka | |
| 3,003,794 A | * | 10/1961 | Burley | |
| 5,577,776 A | * | 11/1996 | Welch | 285/210 |
| 6,179,340 B1 | | 1/2001 | Adolf et al. | |

FOREIGN PATENT DOCUMENTS

| | | | | |
|---|---|---|---|---|
| DE | 300546 | * | 9/1917 | 285/210 |
| DE | 29 30 833 A 1 | | 2/1981 | |
| DE | 43 25 420 A 1 | | 2/1995 | |
| DE | 196 29 012 A1 | | 1/1998 | |
| DE | 298 05 028 U 1 | | 7/1998 | |
| DE | 298 11 259 U1 | | 10/1998 | |
| DE | 198 12 079 C1 | | 4/1999 | |
| EP | 0 151 272 A2 | | 8/1985 | |
| GB | 13936 | * | 4/1909 | 285/210 |

* cited by examiner

*Primary Examiner*—Teri Pham Luu
(74) *Attorney, Agent, or Firm*—Akin, Gump, Strauss, Hauer & Feld, L.L.P.

(57) ABSTRACT

A connection fitting (1) for fastening long bodies (2), such as cables, hoses, or pipes to an opening (3), for example in a wall (4) of a housing, has at least one fastening projection (5) which is divided by slits (6) opening in the radial and axial direction into abutment tongues (7). These tongues (7) have mounting projections (8) on their free ends projecting radially from the axis of the connection fitting (1). These abutment tongues (7) can be deformed radially inwardly of the fastening projection (5), when the fastening projection (5) is shoved into the opening (3), and thereby reach the mounting position behind the edge (12) of the opening (3). At a distance from the mounting projections (8) at least one stop (14) is arranged, which rests in the use position against the edge (15) lying opposite the edge (12) of the opening (3) engaged behind. A locking device (16), which in the loosened position is arranged outside of the area of the abutment tongues (7) and in the use position is arranged to be locking between them and blocking their radial deformation, has an outer threading, and the fastening projection (5) has an inner threading (18) fitting therewith. On the fastening projection (5) there is a carrier stop (19) for the lock (16), on which the lock comes to rest in its locking position. The fastening projection (5) also has an outer threading (20) opposite in direction from the outer threading (17) of the lock (16), which fits into an internal threading (21) of an opposing piece (22) that forms the stop (14). By movement of the lock (16) into the locking position, the connection fitting (1) can be braced with its fastening projection (5) on the opening (3) and adapted to different thicknesses of the wall (4).

12 Claims, 4 Drawing Sheets

CONNECTION FITTING FOR FASTENING LONG BODIES

BACKGROUND OF THE INVENTION

The invention relates to a connection fitting, in particular an angle-shaped or T-shaped connection fitting, for fastening long bodies, for example hoses, corrugated hoses, pipes, cables, or the like, to an opening, a hole or a perforation (hereinafter simply "opening"), for example in a wall of a housing or the like. The connection fitting has at least one fastening projection, which is divided by open slits into abutment tongues. Mounting projections are arranged on the free ends of the tongues projecting radially outwardly, such that these abutment tongues can be deformed radially inwardly by the edge of the opening, and reach the mounting position behind the edge, when the fastening projection is shoved into the opening. The mounting projections engage at least partially behind this edge, and at least one stop is arranged at a distance from the mounting projections, which stop rests in the use position on the edge of the opening engaged behind, or similar opening edge lying opposite thereto. The connection fitting has in its interior as a part thereof an axially movable locking device, which in a detached position is arranged outside of the area of the abutment tongues or mounting projections and in the use position is arranged to mesh between them and to block the mounting projections against a radial inward deformation in this use position.

Such a connection fitting is known from German Patent DE 198 12 079 C1 and has proven its usefulness. However, precautions must be taken with it to be able to move the lock in the axial direction into its locking position. In addition, measures must be taken to brace the fastening projection with its mounting projections with the stop on the edge of the opening.

In one embodiment according to FIGS. 9 to 12 of German Patent DE 198 12 079 C1, a lock is provided with activation projections sticking radially outwardly through the slits of the fastening projection, which mesh into a ring groove of a union nut. This ring groove engages with its inner threading in an outer threading of the fastening projection and can thus be screwed in relative thereto and axially displaced by the screw movement. At the same time, with its facing end facing the opening, the ring groove forms the stop. By screwing in this union nut, the bracing is effected on the opening, and at the same time, the lock is shifted axially.

There, the slits running in the axial direction in the fastening projection must be appropriately long. In addition, this external union nut or screw sheath is freely accessible, so that unauthorized persons could detach or loosen the connection. Furthermore, a union nut or screw sheath of this type is seen as expensive because of the ring groove located inside it. Finally, the assembly is also made more difficult, and the radial activation projections of the lock must be designed to be elastic and themselves provided on individual fingers, so that they give way sufficiently in the radial direction when they are shoved into the union nut or screw sheath, in order to be able to jump into the ring groove. This, together with the mounting of the lock, also makes the manufacture of the lock expensive.

SUMMARY OF THE INVENTION

An object of the invention is therefore to create a connection fitting of the type described at the outset, which retains the advantage that the bracing of the stop on the edge of the opening can be effected by the axial shifting movement of the lock into its locking position without, however, the lock having to have one or more radial projections.

In order to achieve this apparently contradictory objective, the connection fitting described at the outset is characterized by the lock having an outer threading and the fastening projection having an inner threading fitted thereto, by a carrier stop for the lock being provided on the fastening projection to be moved axially into the lock position by a screw movement, by the fastening projection itself having an outer threading in the opposite direction from the outer threading of the lock, and by the fastening projection fitting or meshing with its outer threading into an internal threading of an opposing piece which forms or has the stop.

In this manner, the lock can be brought into the lock position by its external threading and a screw movement, so that for such a displacement movement, no radially projecting projections are necessary. For example, with the help of an auxiliary tool, action can be exerted into the inner opening of the lock or on its end face for this screw movement. In this manner, the lock reaches the carrier stop by the screw movement, so that a continuation of the screw movement in the same direction then causes the withdrawal of the fastening projection with its mounting projections against the edge of the opening engaged behind, until the edge of the opening is clamped on both sides between the mounting projections and the stop. Thus, on the one hand, the bracing on the opening can be effected very easily, and at the same time, an adaptation to the different wall thicknesses can be automatically achieved in this opening region. At the same time, the lock represents a relatively simple and accordingly also a cost-effective part, because it does not require axial slits and radially projecting projections.

It is especially expedient if the lock can be rotated using an auxiliary tool fitting its inner opening and insertable therein, and is thereby screwable and axially moveable. The inner opening of the lock is easily accessible, so that such a design, in which an auxiliary tool fits into this inner opening, makes assembly easier in a simple manner.

Here, the lock can be a sheath, which carries the outer threads on its outer side. Such a sheath having external threads can be manufactured and also assembled in a very simple way and thus make possible the necessary locking action and simultaneously the carrying action upon reaching the carrier stop.

One possible embodiment of the connection fitting can thus comprise the lock having, on its inner side over at least a part of its axial length, an inner contour or profiling that deviates from a circular shape, to be acted upon by a rotatable and pivotable auxiliary tool, in particular an inner polygon or inner hexagon for an Allen wrench. Allen wrenches are common tools, so that the adaptation of the sheath to them makes assembly easier, since an additional special auxiliary tool does not have to be made.

The connection fitting can be constructed as a sheath part having an inner long cavity directed at an angle, especially perpendicular, to the opening, or as a flange part with a sealable opening of the inner long cavity, wherein the seal of the flange part can be a lockable cover, for example a snap cover.

This makes it easier, on the one hand, to fasten and anchor, for example, a corrugated hose or even a cable or similar long body and, on the other hand, makes the lock and its inner contour accessible to an auxiliary tool in a simple manner.

Here, the profiled inner side of the lock can be accessible to an auxiliary tool from its two sides at least temporarily, namely during assembly, so that depending on the spatial relationships, the affixing and anchoring of one or the other side of the wall having the opening can occur.

Especially by combination of individual or several of the above-described features and measures, a connection fitting results having a lock that can be moved in the axial direction for affixing a fastening projection having a mounting projection. This lock can be a simple sheath having an outer threading, which after reaching a carrier stop carries the fastening projection with it in the direction of rotation by an additional rotation. This fastening projection can thereby be braced axially against the opening edge, because of its outer threading against an inner threading of a part provided with a stop, and thereby makes possible and produces an automatic adaptation to the thickness of the wall having the opening.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings in partially schematic representation.

DETAILED DESCRIPTION OF THE INVENTION

Figure 2:
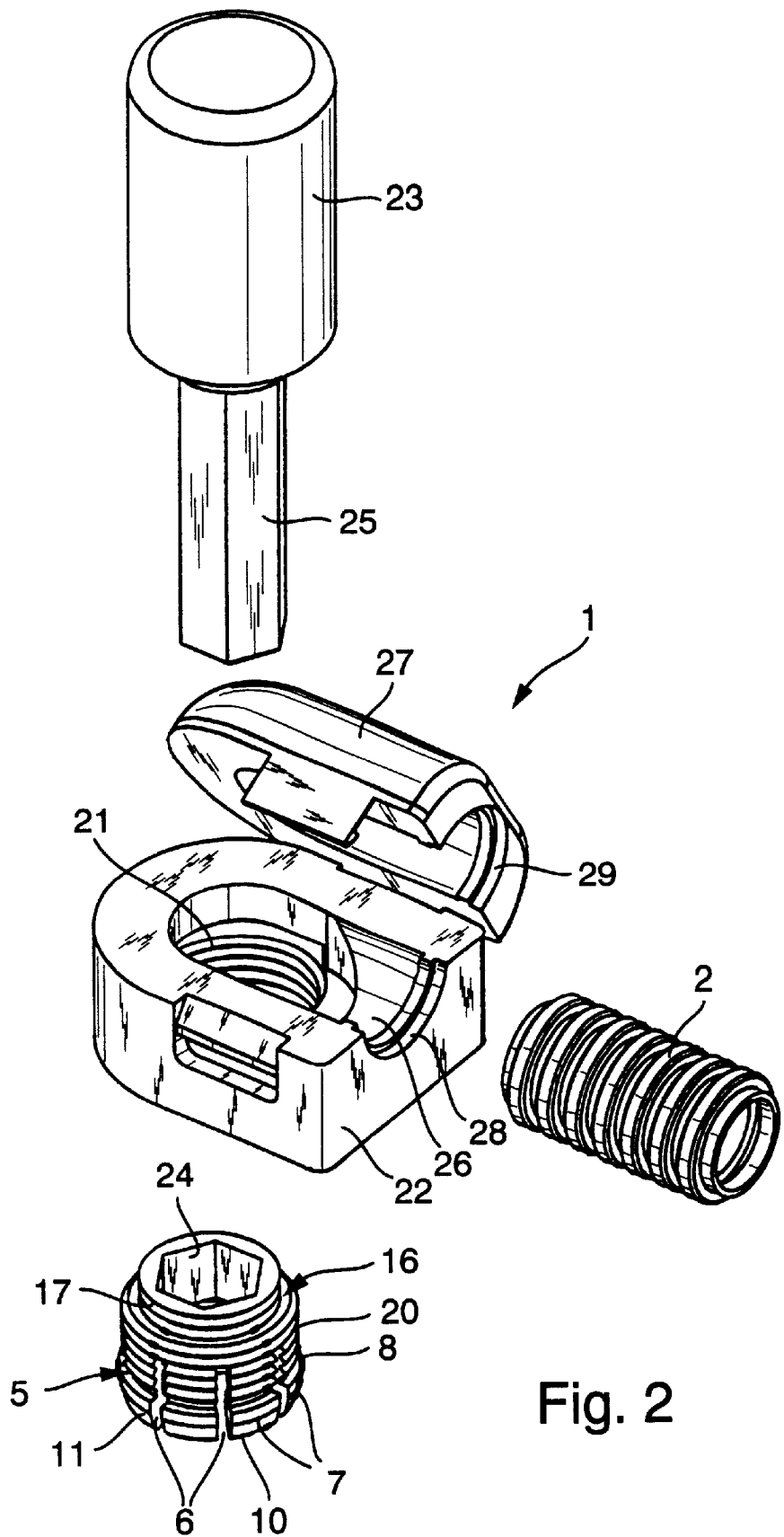
FIG. 2 is a perspective view of the individual parts of the connection fitting prior to its assembly, wherein a lock belonging to the connection fitting is already at least partially screwed into a sheath-shaped fastening projection.
Figure 6:
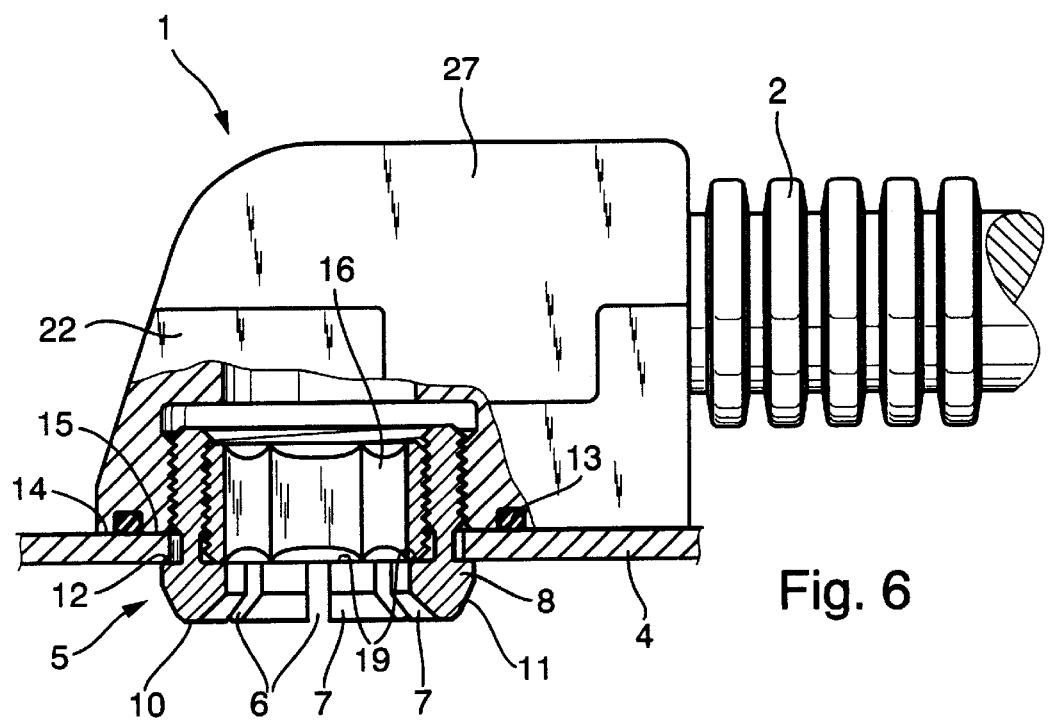
FIG. 6 is a side view, partially taken in longitudinal section, of the connection fitting after its mounting, wherein the lock is drawn into locking position, and the fastening projection is drawn against the opening edge and towards a stop.
Figure 7:
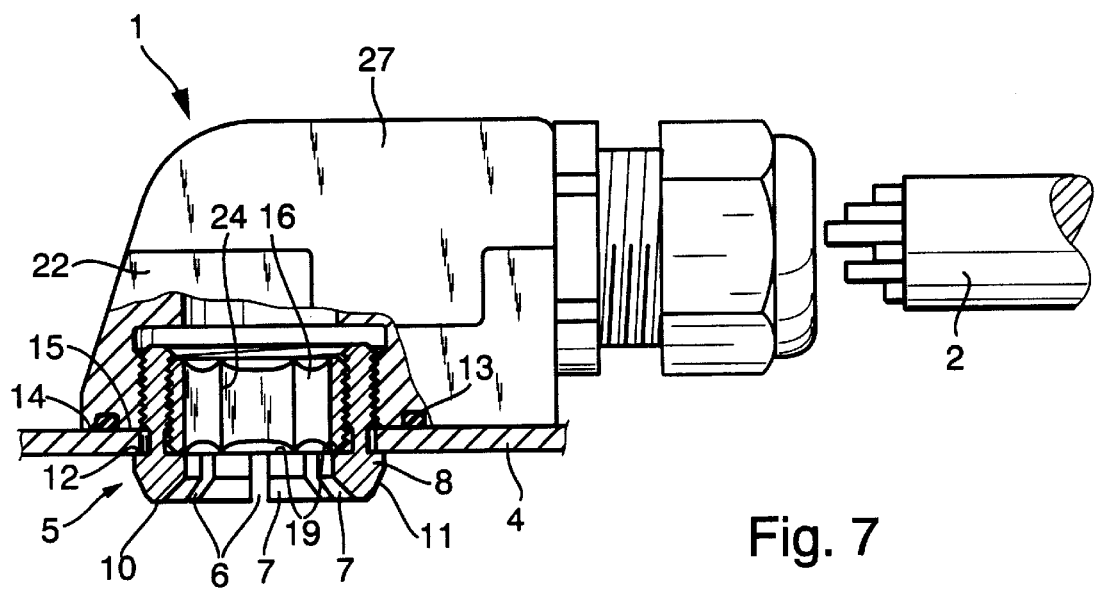
FIG. 7 is a representation corresponding to FIG. 6, of a modified embodiment, in which instead of a corrugated hose, a cable can be mounted on the connection fitting using a cable screw fitting.

A connection fitting, designated as a whole by 1, functions for fastening long bodies 2, for example hoses or corrugated hoses, as indicated in FIGS. 2 and 6, or cables, as shown in FIG. 7, and which accordingly are each designated in the following description by "2", on an opening 3 in a wall 4, for example of a housing or the like.

Here, the connection fitting has in each case a fastening projection, designated as a whole by 5, which in the use position penetrates the opening 3 of the wall 4 and is arranged with one part on the other side of the wall 4 opposite the larger part of the connection fitting 1. The opening here is generally a circular opening or a comparable perforation.

According to FIGS. 1 and 2, the fastening projection 5 is divided by slits 6, running in the axial direction to its free end and opening there, also penetrating in the radial direction, into several abutment tongues 7 (hereinafter also abbreviated as "tongues 7") uniformly distributed around the circumference. On the free end of these tongues 7, i.e., on the end facing away from the largest part of the connection fitting in the use position or mounted position, these tongues 7 have mounting projections 8 projecting radially outwardly. Here, the drawing Figures make it clear that these projections 8 still have a distance extending out from their actual catch and mounting surfaces 9 to the end face 10 of the end of these tongues 7, i.e., the mounting projections 8 have a certain axial extension. Consequently, they can run conically or slanted on their outer side 11, in order to make easier the introduction into the opening 3 and an elastic compression effected thereby in the radial direction toward the middle, until the catch and mounting surfaces 9 reach behind the wall 4, opposite the remaining part of the fitting 1, in order to then come to rest in the use position achieved, on the edge 12 of the opening 3 now engaged behind.

In the embodiments shown, a stop 14 containing a seal 13 is provided at a distance from the mounting projections 8 and their mounting surfaces 9. This stop 14 has a distance from the mounting surfaces 9 in the use position, which corresponds to the thickness of the wall 4, so that this stop 14 in the use position rests on the opening edge 15 lying opposite the edge 12 of the opening 3 which is engaged behind, as depicted in FIGS. 6 and 7.

Figure 5:
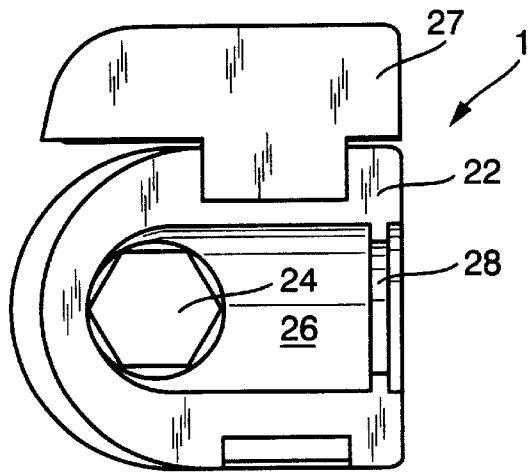
FIG. 5 is a top view of the connection fitting according to FIG. 3.

According to FIGS. 5 and 6, the abutment tongues 7 and the mounting and catch projections 8 projecting radially opposite them, which can be pivoted in an elastic manner because of their material, are so shaped and dimensioned that they catch on the edge 12 with their catch and mounting surfaces 9, after they are shoved into the opening 3.

Figure 3:
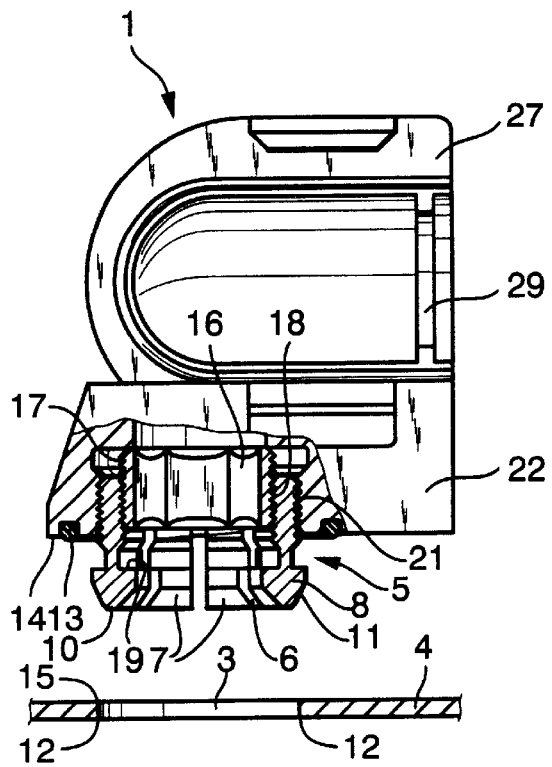
FIG. 3 is a side view, partially represented in longitudinal section, of the connection fitting in an assembled form prior to mounting, wherein the lock within the fastening projection is still out of locking position.
Figure 4:
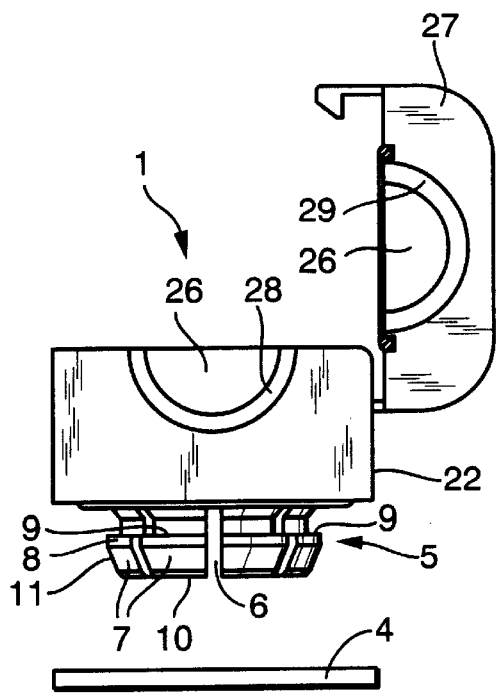
FIG. 4 is an end view of the connection fitting according to FIG. 3.

So that this fastening cannot be loosened in an undesired manner or because of dynamic stresses, the connection fitting 1 has a lock 16 that can be moved in the axial direction, which in the loosened position, according to FIGS. 3 to 5, is arranged outside of the region of the tongues 7 and the mounting projections 8, and in the use position according to the FIGS. 6 and 7, is engagingly arranged between them, wherein it is moved in the axial direction from the first mentioned loosened position into the locking position in a manner yet to be described. In this locking position, it locks the tongues 7 against a radially inwardly directed deformation or pivoting, wherein it can in addition pivot and deform them in this locking movement radially even further outwardly, in case during a first catch, the mounting position was not yet properly assumed. The lock 16 thus brings the mounting projections 8 into the final mounting position, in which the catch and mounting surfaces 9 are effective and engage behind the edge 12 of the opening 3 to a sufficient extent.

It would be conceivable here that prior to the shift of the lock 16 into its locking position, the respective catch and mounting surfaces 9 of the mounting projections 8 engage only partially behind the edge 12 of the opening 3 and to such a small extent that even small forces acting in the axial direction opposite the plug-in direction can again loosen such a connection, so that at any rate the lock 16 is necessary for the final fastening, as described in German Patent DE 198 12 079 C1.

In the embodiments according to FIGS. 1 to 7, the catch and mounting surfaces 9 lie in a plane extending radially to the longitudinal axis, which produces a good holding force and barbed-type connection with the opening edge 12. Because of the lock 16, however, it would also be possible to design the catch surfaces 9 of the mounting projections 8 sloping somewhat towards a plane running radially to the connection fitting 1 and its longitudinal axis, so that they do not run parallel to the wall 4. The slope could thus be directed from the inside outwardly away from the edges 12 of the opening 3, so that a widening cone would be formed directed away from the inside of the hole 3. Also, a loosenable pre-assembly position could be realized, which can be locked by the lock 16 in the use position.

In the FIGS. 2 and 3 the lock 16 is depicted respectively in a loosened position, i.e., it is still located outside of the region of the abutment tongues 7 and the mounting projections 8 and thus still allows catching with the hole 12.

Figure 1:
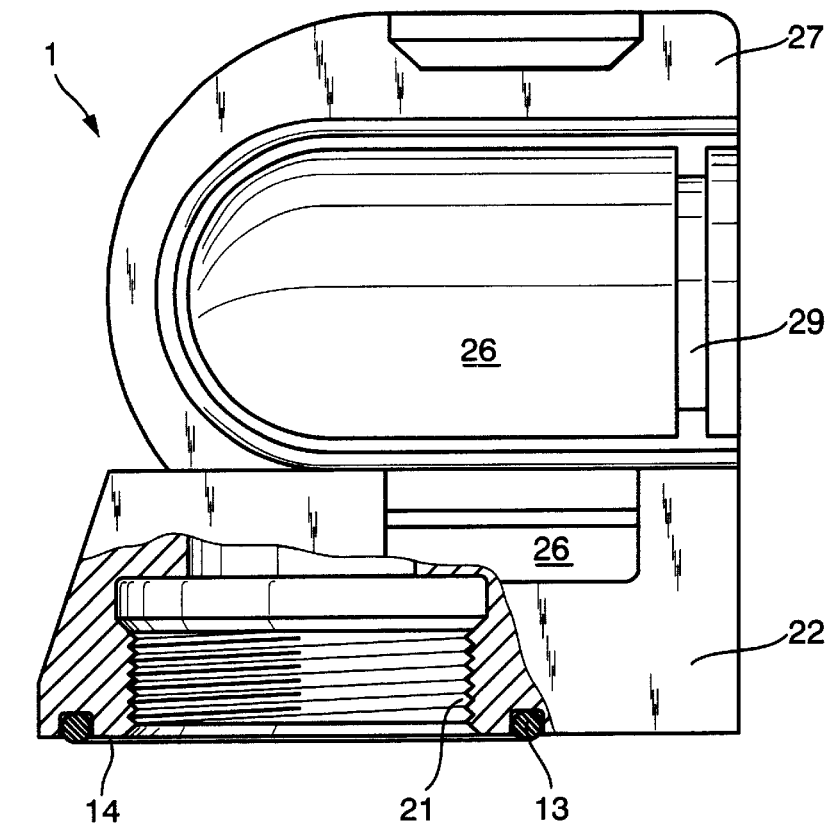
FIG. 1 is a disassembled side view representation, partially in a longitudinal section, of the connection fitting with its individual parts prior to the attachment and prior to the insertion into an opening, for example in a housing wall.
Figure 1:
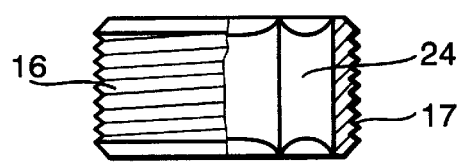
Figure 1:
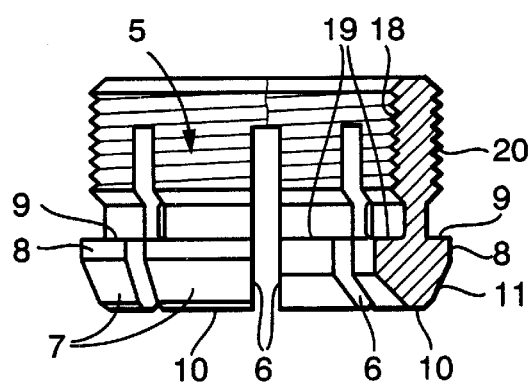
Figure 1:
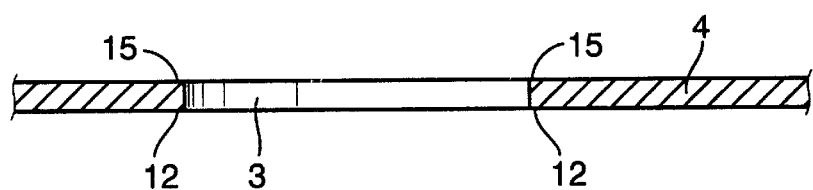

Here, one especially recognizes in FIG. 2, but also in FIGS. 1 and 3, that the lock 16 has an outer threading 17, and the fastening projection 5, constructed as a separate sheath-shaped part, has an inner threading 18 fitted thereto, that on the inside of the fastening projection 5 a carrier stop 19 effective in the axial direction is provided for the lock 16, which can be brought into the lock position by a screw movement, that the fastening projection 5 itself has an outer threading 20 in the opposite direction from the outer threading 17 of the lock 16, and that the fastening projection 5 fits and engages with its outer threading 20 into an inner threading 21 of an opposing piece 22 that forms or has the stop 14.

For fastening the connection fitting 1 and the opposing piece 22, the lock 16 is first partially screwed into the mounting projection 5 as shown in FIG. 2. After that, the fastening projection 5 is itself first partially screwed into the opposing piece 22, whereupon the arrangement results according to FIG. 3. Prior to or after fastening of a corrugated hose or cable 2, the fastening projection 5 can then be inserted through the opening 3, and thus caught on the opening edge 12.

If the lock 16 is then moved in and screwed in by a screwing movement deeper into the fastening projection 5, it finally reaches the carrier stop 19, whereupon a radial deformation of the mounting projection 8 is no longer possible.

If the screwing movement is continued, the fastening projection 5, because of its opposing outer threading 20, is moved deeper into the opposing piece 22, thus further upward out of the position depicted in FIG. 3. If this happens after catching with the opening 3, a bracing with the opening edges 12 and 15 results thereby, and thus also an automatic adaptation to the thickness of the wall 4. Here, it is advantageous that one and the same rotating movement can come to be applied, on the one hand for screwing the lock 16 and on the other hand for screwing the fastening projections 5, because on the one hand the carrier stop 19 is present for the lock 16 within the fastening projection 5, and the respective threadings are opposing.

The lock 16 can thereby be rotatable by means of an auxiliary tool 23 fitting and insertable into its inner opening, and thereby be screwable and axially movable, which auxiliary tool 23 is indicated in FIG. 2. Here it is beneficial that the lock 16 is a sheath which carries the outer threading 17 on its outer side. The lock 16 has on its inner side, over at least a part of its length and expediently over its entire length or axial extension, an inner contour or profiling deviating from a circular shape for engagement with the rotatable auxiliary tool 23. In the embodiment according to FIG. 2, this contour is an inner hexagon 24 for a corresponding Allen wrench. In FIG. 2 one recognizes therein not only the inner hexagon 24 on the lock 16, but also the correspondingly fitting external hexagon 25 on the auxiliary tool 23. Here, FIG. 5 makes it clear that when the opposing piece 22 is opened, this inner hexagon 24 of the lock 16 can be reached without problems by the auxiliary tool 23 and its outer hexagon 25 going through the opposing piece 22. Just as well, however, this auxiliary tool 23 can also be introduced into the lock 16 from the opposing side, if a corresponding accessibility is produced from the side of the wall 4 facing away from the connection fitting 1.

The connection fitting 1 can be designed in various ways, for example it can be constructed as a sheath part similar to the connection fitting according to German Patent DE 198 12 079 C1. In the embodiment, however, it is constructed as a sheath part having an inner lengthwise cavity 26 directed at an angle, especially perpendicular, to the opening 3 or as an angular piece or as a flange part with a sealable opening of the internal lengthwise cavity 26. In the embodiment the seal of this flange part or opposing piece 22 with the inner lengthwise cavity 26 is a catchable lid 27, for example a snap lid, which in FIGS. 1 to 5 is depicted in the open position, and in FIGS. 6 and 7 is depicted in the closed mounting position. The internal lengthwise cavity of this flange part or opposing piece 22 thus ends with a rib 28 directed radially inwardly, which continues in a corresponding rib 29 on the lid 27. If the corrugated hose 2 is placed into the inner lengthwise cavity, the ribs 28 and 29 can engage in a valley of the corrugated hose and fix it in the axial direction, as shown in FIG. 6. Thus, this flange part or opposing piece 22 has a multifunctionality, in which on the one hand, it receives the fastening projection 5 and the seal 13 and forms the stop 14 when fixing the fastening projection 5, and finally fixes the corrugated hose 2 or even a cable or similar long body, and indeed, in this case, in an arrangement oriented parallel to the wall 4.

FIG. 6 shows an embodiment in which on the flange part or opposing piece 22 at its outlet, a cable screw connection is arranged approximately according to German Patent DE 35 19 032 C1 or according to German Patent DE 36 40 832 C2, in order to fix a long body 2, constructed as a cable, to the connection fitting in a similar manner as the corrugated hose described above.

The connection fitting 1 can thus be braced by the movement of the lock 16 into its locking position even with its fastening projections 9 on the edges 12 and 15 of the opening 3 and thereby be fitted to walls 4 having different thicknesses, all of which is achieved by one and the same rotational movement of an auxiliary tool 23 for screwing in the lock 16 and the fastening projection 5. The handling is thus very simple because of these features and measures.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A connection fitting (1) for fastening a long body (2) to an opening (3) within a wall or a plate, the connection fitting (1) comprising at least one fastening projection (5), which is divided by open slits (6) into abutment tongues (7), the tongues (7) having free ends with mounting projections (8)

projecting radially outwardly therefrom, such that the tongues (7) can be deformed radially inwardly by a first edge (15) of the opening (3) when the fastening projection (5) is shoved into the opening (3) and can reach a mounting position behind a second edge (12) of the opening (3) in which the mounting projections (8) at least partially engage behind the second edge (12), wherein at a distance from the mounting projections (8) at least one stop (14) is arranged, which in the use position rests against the first edge (15) of the opening (3) lying opposite to the second edge (12) of the opening (3), the connection fitting (1) having in its interior as a part thereof an axially movable lock (16), being arranged outside an area of the tongues (7) or mounting projections (8) in a loosened position, while being arranged to engage between the mounting projections (8) and blocking them against any radial inwardly directed deformation in the use position, wherein the lock (16) has an outer threading (17) being combinable with an inner threading (18) of the fastening projection (5), wherein a carrier stop (19) for the lock (16) is provided on the fastening projection (5), the lock (16) being axially movable into a locking position by a screw movement, wherein the fastening projection (5) itself has an outer threading (20) opposite in direction from the outer threading (17) of the lock (16), and wherein the fastening projection (5) fits with its outer threading (20) into an internal threading (21) of an opposing piece (22) having the stop (14).

2. The connection fitting according to claim 1, wherein the lock (16) is rotatable and thereby screwable and axially movable using an auxiliary tool (23) that fits and is insertable into an inner opening of the lock (16).

3. The connection fitting according to claim 1, wherein the lock (16) is formed as a sleeve which carries the outer threading (17) on its outer side.

4. The connection fitting according to claim 1, wherein the lock (16) has on its inner side over at least a part of its axial length an inner contour or profiling deviating from a circular shape for engagement by a rotatable auxiliary tool (23).

5. The connection fitting according to claim 4, wherein the inner contour or profiling comprises an inner polygon or inner hexagon (24) for an Allen wrench.

6. The connection fitting according to claim 4, wherein the profiled inner side of the lock (16) is accessible to an auxillary tool (23) from both its sides.

7. The connection fitting according to claim 1, wherein the fitting is constructed as an angular sleeve part having an inner lengthwise cavity (26) directed at an angle to the opening (3).

8. The connection fitting according to claim 1, wherein the fitting is constructed as a flange part (22) with a sealable opening of an internal lengthwise cavity (26), wherein a seal of the flange part (22) comprises a lid (27).

9. The connection fitting according to claim 8, wherein the lid (27) is a snap lid.

10. The connection fitting according to claim 1, wherein the fitting is an angle-shaped or T-shaped connection fitting.

11. The connection fitting according to claim 1, wherein the connection fitting is adapted for fastening a long body selected from the group consisting of hoses, corrugated hoses, pipes, and cables.

12. The connection fitting according to claim 1, wherein the connection fitting is adapted for fastening to an opening in a wall of a housing.

* * * * *